US012597667B2

(12) United States Patent
 Karlsson et al.

(10) Patent No.: US 12,597,667 B2
(45) Date of Patent: Apr. 7, 2026

(54) STRUCTURAL BATTERY FOR AN ELECTRIC VEHICLE COMPRISING A BATTERY CELL SUPPORT MATRIX

(71) Applicant: Volvo Car Corporation, Gothenburg (SE)

(72) Inventors: Daniel Karlsson, Gothenburg (SE); Klas Persson, Kungälv (SE); Martin Hjälm Wallborg, Harestad (SE)

(73) Assignee: Volvo Car Corporation, Gothenburg (SE)

( * ) Notice: Subject to any disclaimer, the term of this patent is extended or adjusted under 35 U.S.C. 154(b) by 764 days.

(21) Appl. No.: 17/861,319

(22) Filed: Jul. 11, 2022

(65) Prior Publication Data

US 2023/0022211 A1 Jan. 26, 2023

(30) Foreign Application Priority Data

Jul. 16, 2021 (EP) ..................................... 21186240

(51) Int. Cl.
 *H01M 50/249* (2021.01)
 *H01M 10/613* (2014.01)
 (Continued)

(52) U.S. Cl.
 CPC ....... *H01M 50/249* (2021.01); *H01M 10/613* (2015.04); *H01M 10/625* (2015.04); *H01M 10/647* (2015.04); *H01M 10/6556* (2015.04); *H01M 50/242* (2021.01); *H01M 2220/20* (2013.01)

(58) Field of Classification Search
 CPC . B60L 50/64; H01M 10/653; H01M 10/6554; H01M 10/658; H01M 50/209; H01M 50/233; H01M 50/244; H01M 50/264; H01M 50/289; H01M 10/6568; H01M 50/204
 See application file for complete search history.

(56) References Cited

U.S. PATENT DOCUMENTS

2014/0065455 A1* 3/2014 Chuang ............... H01M 50/262
 429/82
2017/0012330 A1* 1/2017 Kim .................... H01M 10/663
 (Continued)

FOREIGN PATENT DOCUMENTS

DE 102017204412 A1 9/2018
DE 2019220260 A1 6/2021
 (Continued)

OTHER PUBLICATIONS

Dec. 10, 2021 European Search Report issued in International Application No. 21186240.

*Primary Examiner* — Adam A Arciero
(74) *Attorney, Agent, or Firm* — Clements Bernard Walker; Christopher L. Bernard

(57) ABSTRACT

An electric vehicle including a battery assembly with at least two rows of battery cells attached to a battery frame structure. The battery frame structure has a number of accommodating cavities, arranged in a matrix, each battery cell being placed in a respective accommodating cavity and connected to adjacent walls of the respective accommodating cavity via a flowable bonding substance being inserted in a gap between the cells and the walls of the respective cavity.

16 Claims, 5 Drawing Sheets

(51) Int. Cl.
| | | |
|---|---|---|
| *H01M 10/625* | (2014.01) |
| *H01M 10/647* | (2014.01) |
| *H01M 10/6556* | (2014.01) |
| *H01M 50/242* | (2021.01) |

(56) References Cited

U.S. PATENT DOCUMENTS

| | | | |
|---|---|---|---|
| 2021/0013463 A1 | 1/2021 | Yuichi et al. |
| 2021/0057789 A1 | 2/2021 | Lee et al. |
| 2021/0135313 A1 | 5/2021 | Martin et al. |
| 2021/0203028 A1 | 7/2021 | Byungkook et al. |

FOREIGN PATENT DOCUMENTS

| | | | | | |
|---|---|---|---|---|---|
| EP | 3584877 A1 | 12/2019 | | |
| EP | 3739683 A1 | 11/2020 | | |
| KR | 20190131415 A | 11/2019 | | |
| WO | 2015126209 A1 | 8/2015 | | |
| WO | WO-2018071762 A1 * | 4/2018 | ............... | B60K 1/04 |
| WO | 2019189280 A1 | 10/2019 | | |
| WO | WO-2020094366 A1 * | 5/2020 | .......... | H01M 10/627 |

* cited by examiner

STRUCTURAL BATTERY FOR AN ELECTRIC VEHICLE COMPRISING A BATTERY CELL SUPPORT MATRIX

CROSS-REFERENCE TO RELATED APPLICATION

The present disclosure claims the benefit of priority of co-pending European Patent Application No. 21186240.4, filed on Jul. 16, 2021, and entitled "Structural Battery for an Electric Vehicle Comprising a Battery Cell Support Matrix," the contents of which are incorporated in full by reference herein.

TECHNICAL FIELD

The present disclosure relates to an electric vehicle including a battery assembly with at least two rows of battery cells attached to a battery frame structure. The present disclosure also relates to a battery pack for use in such an electric vehicle and to a method of manufacturing such a battery assembly.

BACKGROUND

Electrical vehicles (also known as Battery Electric Vehicles, BEVs in short) use a battery pack to provide electricity to the drive train/motor(s). To provide enough range with current cell technology, in line with customer expectations coming from a fossil fuel car, a BEV battery is located underneath the passenger compartment, basically under the floor. The overall design complexity involves maximizing cell volume (range) into a given footprint (area/volume) provided by the car setup, to the lowest weight possible (range/environmental impact) while also maximizing highly important attributes such as crash safety and vehicle stiffness (NVH and driver experience).

Up until recently a battery electric vehicle pack has been as a standalone unit with main function of being a safety cage for cells and modules preventing intrusion causing catastrophic failure, while also protecting the sensitive electronics inside from the outside environment. This thinking has led to double structures; Battery and body of the vehicle. Having double structures with the necessary gaps to allow for tolerances and general occupies a volume that could have otherwise been used for integrating more cell volume, further increasing range, had the two systems been seen and engineered as one system. Current art is compensating for this lower volumetric efficiency by using a larger footprint, leading to a shorter stopping distance (in longitudinal and lateral direction) between frame structure and cell footprint. An increasing size of the vehicle results in in increased energy content.

It is known to provide structural batteries in which the battery casing forms the bottom of the vehicle body and the traditional front floor is removed. The arrays of battery cells are kept in place inside the casing of the battery pack by means of a resin.

It is an object of the present disclosure to provide an electric vehicle with a battery pack having an improved volumetric efficiency and forming a structural part of the vehicle body. It is another object of the present disclosure to provide a relatively compact structural battery pack for which the number of components are reduced and that can be manufactured in an efficiently manner. It is another object of the present disclosure to provide a battery pack that is provided with an impact absorption zone by which the battery cells are protected from forces arising upon impact.

SUMMARY

An electric vehicle according to the present disclosure includes a battery frame structure with a number of accommodating cavities, arranged in a matrix, each battery cell being placed in a respective accommodating cavity and connected to adjacent walls of the respective accommodating cavity via a flowable bonding substance being inserted between the cells and the walls of the respective cavity.

The battery cells are accurately and firmly positioned in the matrix structure of the preformed accommodating cavities. Because the cells are interconnected by being firmly bonded to the walls of the cavities, the number of internal fastener members that are required to keep the cells in place, such as end plates, bolt fixations, tension straps etc., can be reduced. This allows the entire cell foot print to shrink in XY plane, compared to a modular design equivalent.

The interconnected cells in the matrix of the accommodating cavities form, after curing of the bonding substance, a rigid and integral brick of cells that can be easily handled and that can be accurately placed in the required position relative to a frame or tray of the battery pack and relative to frame parts of the electric vehicle.

The battery frame structure may include longitudinal and transverse side walls. The sidewalls and the walls of the accommodating cavities can be formed by injection molding, casting or additive manufacturing.

The battery frame structure is first formed from the flowable first material that is cured to harden into a solid and rigid matrix. Next, the individual battery cells are inserted into respective cavities and the space between the battery cells and the matrix of cavities is filled with the bonding substance. After curing of the bonding substance, the cells are tightly held in place and a strong and stiff interconnected battery structure is formed, which allows to down-gauge on other frame parts of the car body such as sub frames, brakes or suspension. Once the cells are bonded, a unitary composite block is formed with large torsional stiffness and structural strength of the matrix of embedded cells. If for instance a weight of the bonded cells is around 450 kg, 200 kg of weight saving of peripheral structure parts could be achieved such that an overall weight increase of 250 kg ensues, in which the bonded cells can be considered as "negative mass".

In an embodiment, the accommodating cavities are of substantially the same height as a height of the battery cells, a bottom surface of the battery frame structure being substantially flat and supporting a thermally conductive layer contacting the bottom of each battery cell, a top surface of the battery frame structure being placed in a contacting relationship with a top cover. The bottom layer may be formed of a thermal interface material (TIM) for heat transfer from the cells to a bottom cooling plate. The top cover may be formed of an adhesive material and may connect to a top plate forming a shear plane for distribution of lateral forces to the matrix of embedded battery cells.

The battery frame structure may be placed in a tray member including two longitudinal side profiles that are interconnected via a front and rear transverse beam, longitudinal side walls of the battery frame structure extending at a distance from the longitudinal side members, a compressible filler member being placed between the longitudinal side walls of the battery frame structure and the adjacent longitudinal side profile.

The battery frame structure provides a rigid battery pack with small lateral dimensions. By leaving the space between the side of the cell battery frame structure and the sill members free and not increasing the width of the battery pack, a weight saving is achieved as other parts of the vehicle (suspension, brakes, chassis, wheels) can be made of lighter weight. Also, the deformable material between the cells and the sill members isolates the cells from impact and provide increased safety against intrusion and catastrophic thermal runaway upon side impact.

A top plate and a bottom plate can be placed in contact with a top and a bottom plane of the battery frame structure, forming a casing, the top and bottom plates being attached to the longitudinal profiles, forming a battery pack. The battery pack can be bolted and/or bonded to the vehicle frame members in an easy to handle manner.

In an embodiment, the bottom plate includes a number of cooling channels extending in a length direction, the cooling channels being connected to a cooling fluid inlet at a first transverse beam and being connected to a cooling fluid outlet manifold at a second transverse beam.

The bottom plate can be covered by an insulating layer that forms the external bottom layer of the vehicle.

The front and the rear transverse walls of the battery frame structure may be contacting a respective parallel metal end plate that is rigidly connected to the transverse beams. The end plates restrain the forces in the longitudinal direction, caused by swelling of the battery cells upon ageing, which forces may in an example amount to 10-30 kN.

The front end plate in one embodiment includes a centrally placed force absorption member, preferably formed by extrusion, having an number of compartments. The absorption member provides a very stiff anchoring point with minimal material use and transfers the forces upon frontal impact into the bonded cell and sandwich structure, where it is distributed into the bonded shear planes spreading the load and keeping cell intrusions within safe limits.

A method of manufacturing a battery assembly for an electric vehicle, including:

forming a battery frame structure having longitudinal and transverse sidewalls and including a number of accommodating cavities by injection molding, casting or additive manufacturing, inserting battery cells into the accommodating cavities, the height of the cavities substantially corresponding to the height of the battery members, and filling up a space between the battery cells and the walls of the respective cavity with a bonding material and connecting each battery cell to the walls of the respective cell via the bonding material, forming a unitary cell block.

The method may include:

placing the unitary cell block formed of the interconnected battery cells in a tray member including two longitudinal side profiles that are interconnected via a front and rear transverse beam, the longitudinal side walls of the battery frame structure extending at a distance from the longitudinal side profiles, inserting a deformable member between the longitudinal side walls of the battery frame structure and the adjacent longitudinal side profile, placing a top plate and a bottom plate on the upper and lower surfaces of the battery frame structure, forming a casing, and attaching the casing to a vehicle frame part.

BRIEF DESCRIPTION OF THE DRAWINGS

Embodiments of a battery assembly according to the disclosure will, by way of non-limiting example, be explained in detail with reference to the accompanying drawings. In the drawings.

DETAILED DESCRIPTION OF EMBODIMENTS

Figure 1:
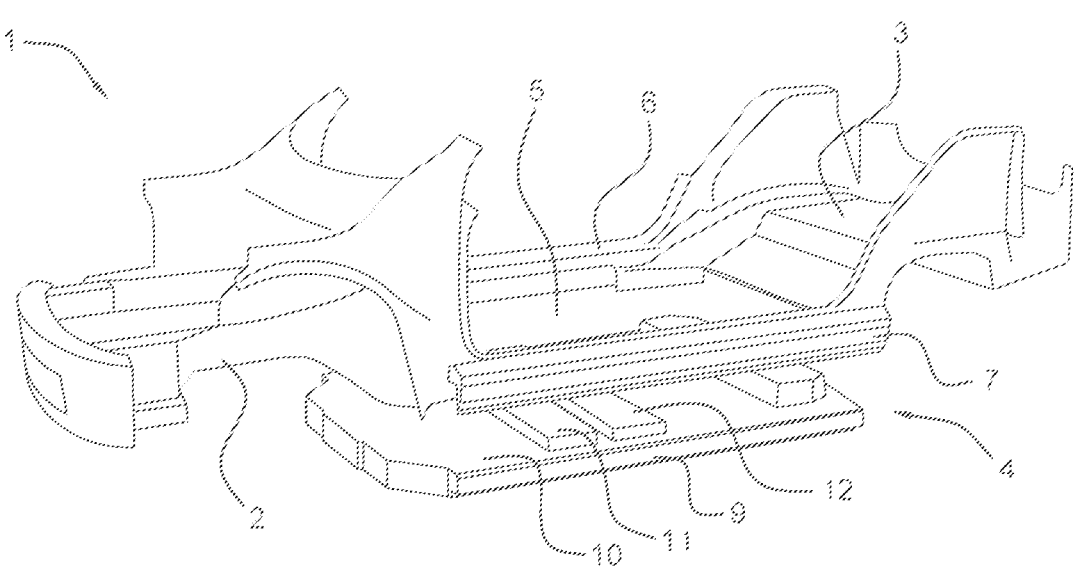
FIG. 1 shows a frame of an electric vehicle including a structural battery.

FIG. 1 shows a frame 1 of an electric vehicle including a body-in-white front frame structure 2, a body-in-white rear floor structure 3, including set or rockers and a structural battery assembly 4 forming a bottom structure 5 of the vehicle. The structural battery assembly 4 includes longitudinal sill profiles 6,7 that interconnect the front and rear frame structures 2,3 and that support a battery pack 9 of interconnected battery cells. Cross beams 11, 12 are connected, for instance via spot welding, to a top plate 10 of the battery pack 9 and extend in a transverse direction, interconnecting the sill profiles 6,7 and supporting front passenger seats.

Figure 2:
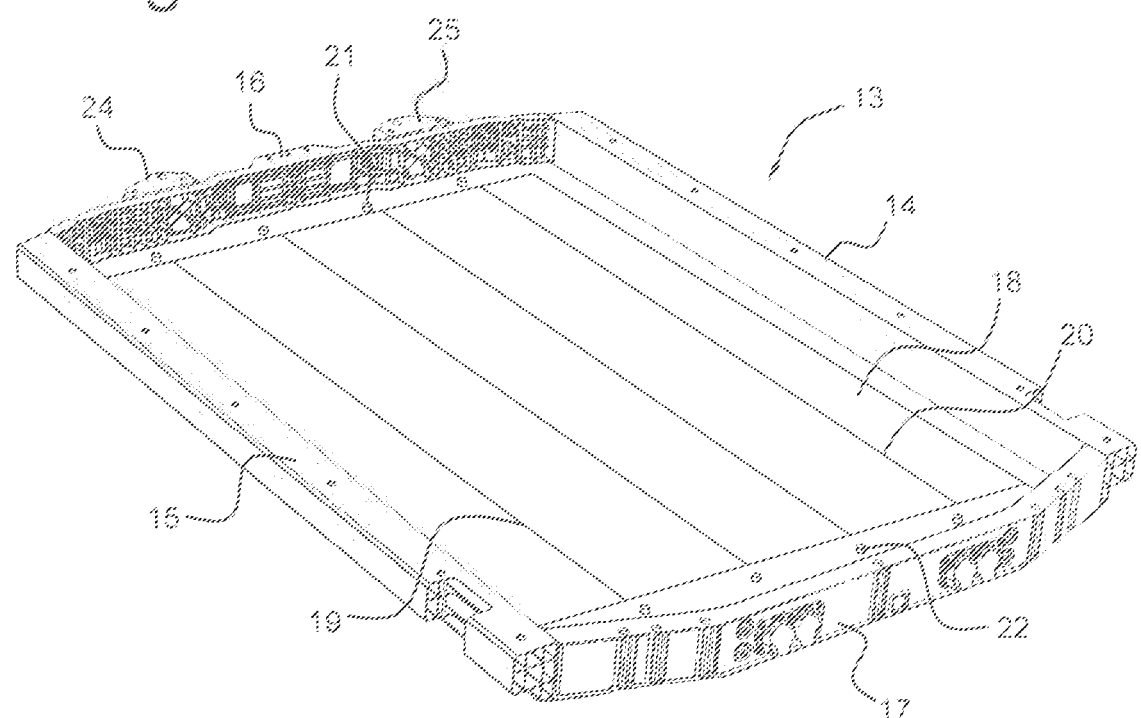
FIG. 2 shows a tray of a battery assembly according to the present disclosure.

FIG. 2 shows a tray 13 of the battery pack 9, having longitudinal side member 14,15 that are interconnected by front transverse beam 16 and rear and transverse beam 17. A metal bottom plate 18 with longitudinal cooling channels 19, 20 forms the bottom of the tray 13. A cooling inlet manifold 21 distributes cooling fluid to the channels 19,20 and an outlet manifold 22 at the rear removes the heated coolant from the channels and transports it to a heat exchanger. At the front transverse beam 16, connecting brackets 24, 25 are provided for providing a rigid connection of the tray 13 to the front frame structure 2 (FIG. 1).

Figure 3:
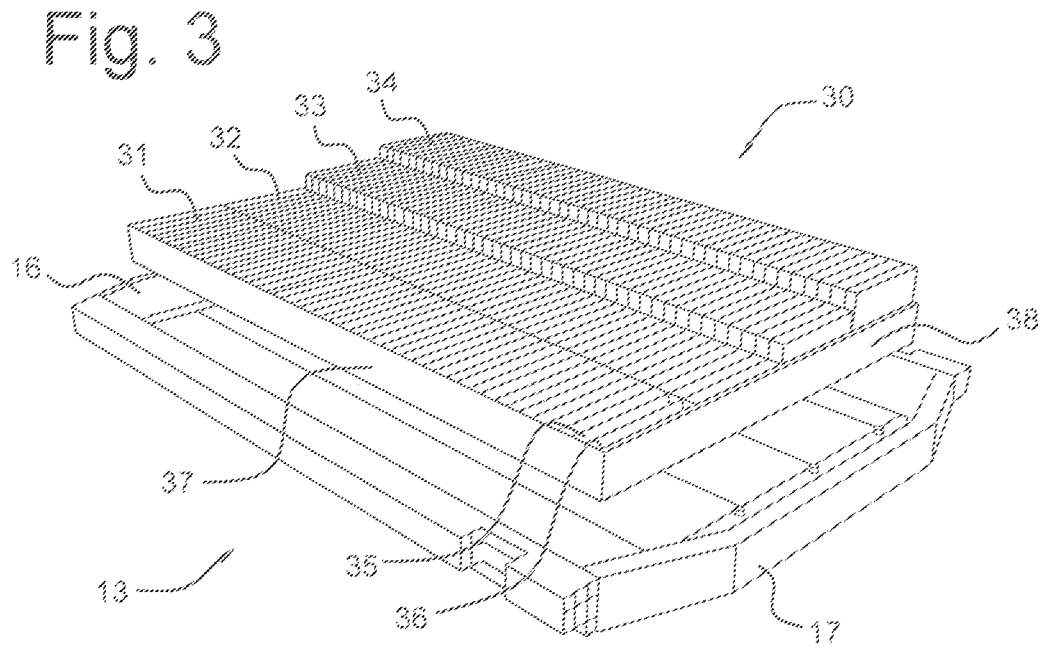
FIG. 3 shows a battery frame structure carrying rows of battery cells.

FIG. 3 shows a battery frame structure 30 carrying four rows 31-34 of battery cells. Each individual cell is placed in a cavity 35, 36 of the battery frame structure 30 and is firmly held in place by a bonding substance that fills up the space between the walls of the cavities 35, 36 and the cell inside the cavity. The battery frame structure 30 has longitudinal and transverse peripheral walls 37, 38 and forms a matrix of interconnected battery cells that can be handled as a unit and that can be accurately positioned in the tray 13. The height of the peripheral walls 37, 38 and of the cavity walls substantially corresponds to the height of the battery cells 31-34, so that the top and bottom surfaces of the assembly of battery frame structure 30 and cells 31-34 is substantially planar.

Figure 4:
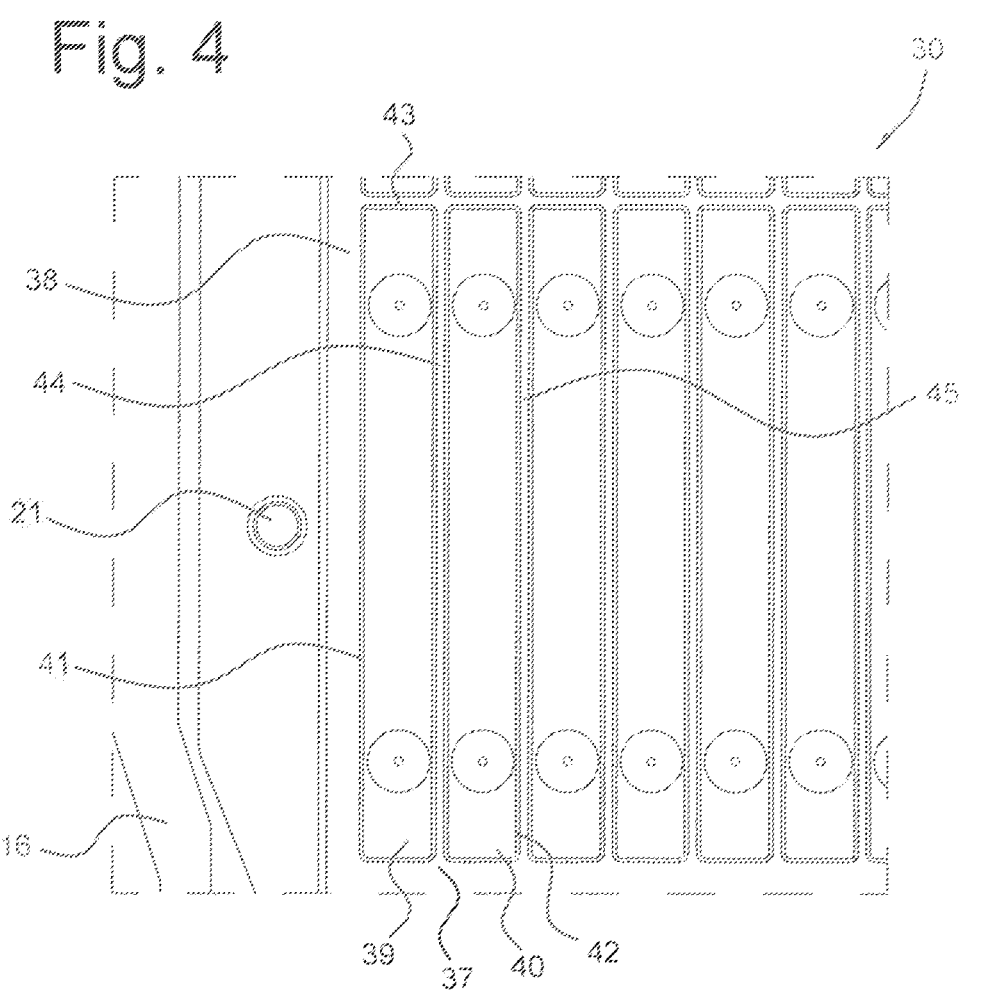
FIG. 4 shows a battery frame structure according to the disclosure.

FIG. 4 shows an enlarged detail of the battery frame structure 30 near the front transverse beam 16. The cells 39, 40 are enclosed within the walls 38,37,43, 44 and 37,43,44, 45 of respective cavities of the battery frame structure. The gaps 41 and 42 between the cells 39, 40 and the cavity walls are filled with a bonding material, that may be formed by an adhesive material or an expanding compound that can flow and fill the gaps and that can expand and solidify to firmly bond the cells to the cavity walls. The expanding compound could provide a pre-compression on the individual battery cells.

Figure 5:
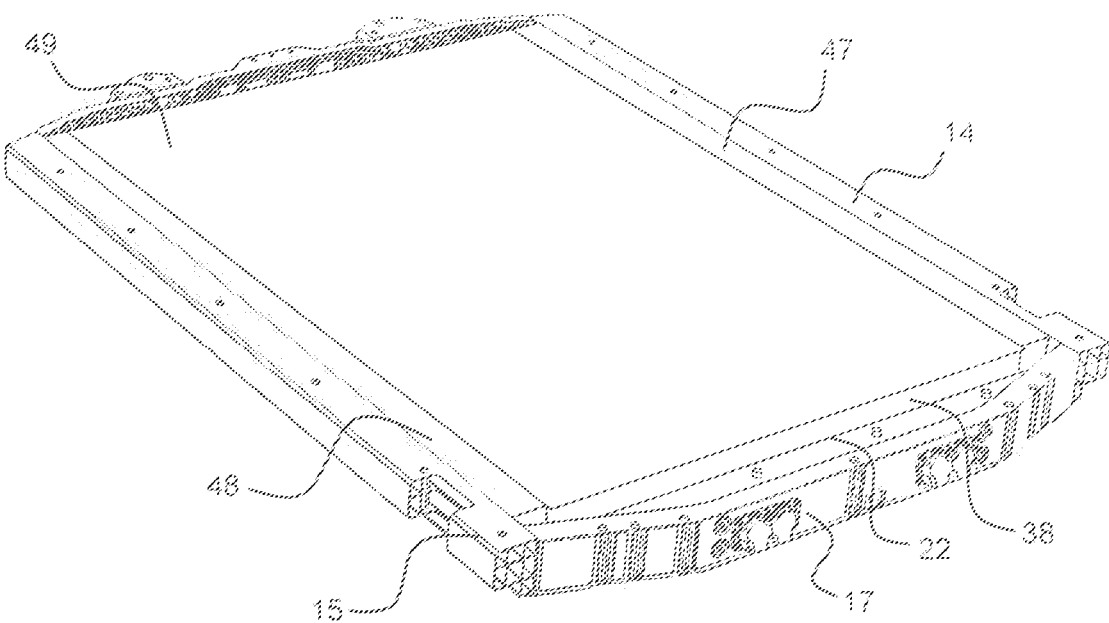
FIG. 5 shows a top view of an enlarged detail of the battery frame structure of FIG. 4.

FIG. 5 shows an adhesive layer 49 that is placed on top of the battery cells in the battery frame structure 30 (FIGS. 3 and 4). The space between the longitudinal side members 14, 15 and the longitudinal peripheral walls 37 of the battery frame structure 30 (FIGS. 3 and 4) is filled with a foam block or honeycomb structure 47,48.

Figure 6:
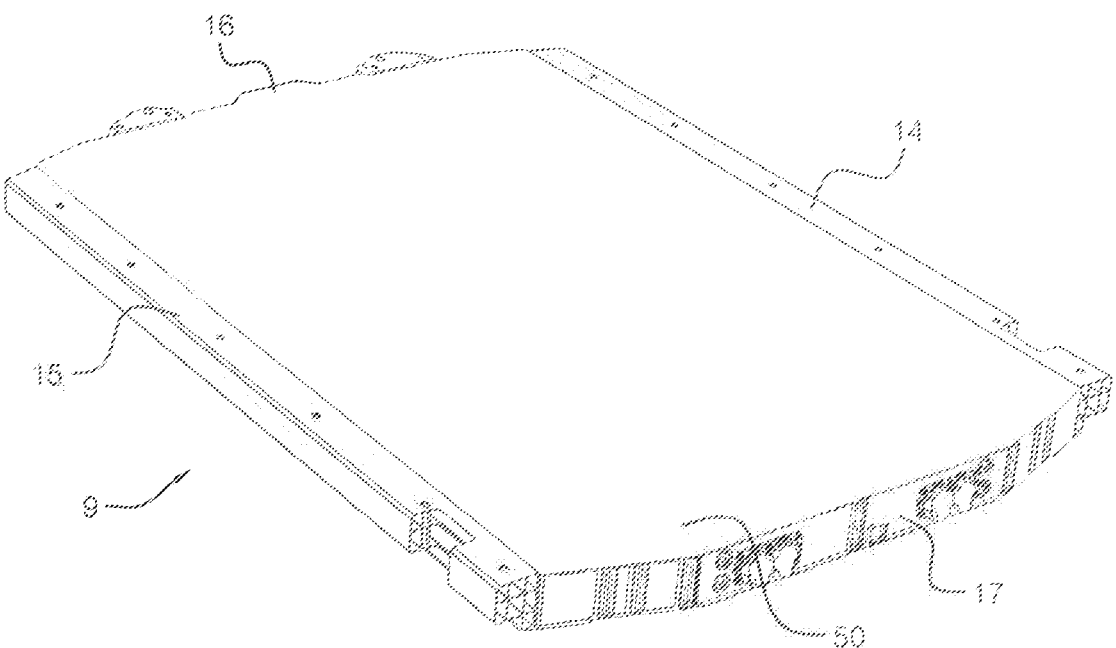
FIG. 6 shows a battery assembly prior to placing the top cover.

As shown in FIG. 6, the battery pack 9 is completed by placing a metal top cover 50 over the battery frame structure 30 and attaching the top cover to the adhesive layer 49 (FIG. 5) and to the side members 14,15 to form a strong casing around the battery cells.

Figures 7, 8:
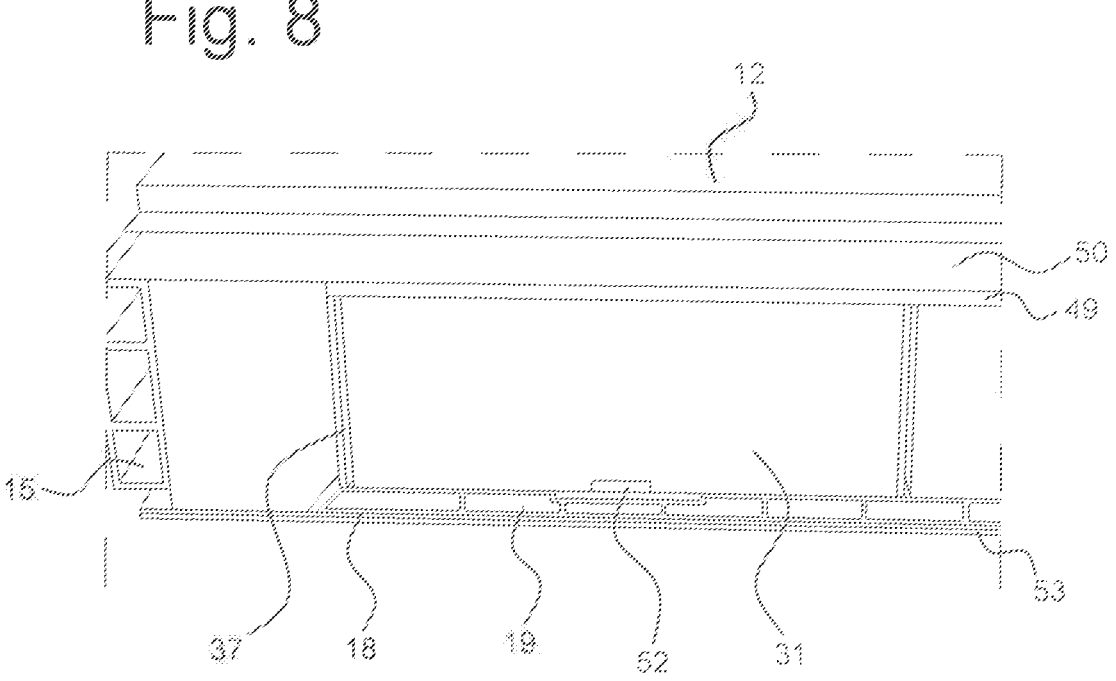
FIG. 7 shows a battery pack according to the disclosure.
FIG. 8 shows a transverse cross-sectional view of the battery pack according to the present disclosure, in a forward viewing direction.

FIG. 7 shows the battery pack 9 connected to the sill profile 7 and to the cross beams 11,12. Upon side impact at the sill profile 7, the transverse forces Fs are distributed along the longitudinal side member 15 to the shear planes that are defined by the lower plate 18 and upper plate of the top cover 50. A deformation zone with a transverse width D is formed by the sill profile 7, the side member 15 and the foam block or honeycomb material 48. The deformation zone protects the battery cells 31,32 upon side impact and prevents rupture of the cells and intrusion upon impact.

FIG. 8 shows an enlarged detail of a longitudinal venting channel 52 extending in a length direction over the cooling channels 19 in the bottom plate 18. In case of a thermal event, gases are evacuated through the venting channel 52 to the rear transverse beam 17 (FIGS. 2, 3, 5, and 6), where the gases can escape to environment. Because the venting channel 52 is cooled by the cooling channels 19 in the cooling plate 18, the risk of burn-through is significantly reduced.

A replaceable insulation layer 53 can be provided over the cooling plate 18 to form the outer layer of the vehicle. The thermal isolation provided by the layer 53 mitigates the wind chill factor of the battery pack 9 (FIGS. 1, 6, and 7) by the environment and prevents uncontrolled heat transfer. In case the insulation layer 53 gets damaged, for instance in case of a de-road accident, it can be easily removed, inspected and serviced or replaced.

Figure 9:
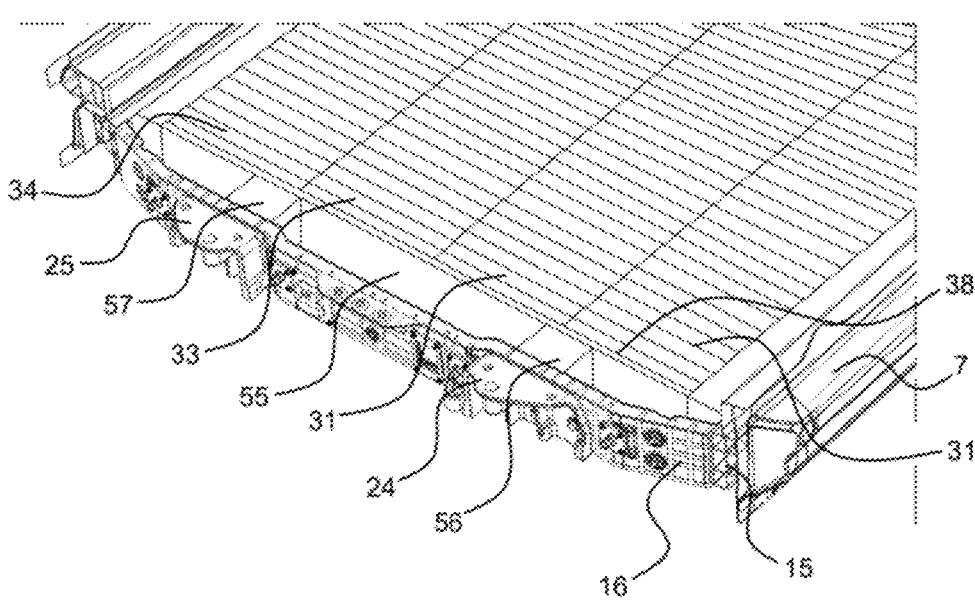
FIG. 9 shows an end plate for reinforcement of the battery frame structure.

FIG. 9 shows a reinforcement metal end plate 55 that is attached to the transverse wall 38 of the battery frame structure and to the front transverse beam 16, via anchor brackets 56, 57. The reinforcement end plate 55 can counteract swelling of the battery cells upon ageing which may cause forces on the sidewalls of the transverse peripheral walls 38 of the battery frame structure 30 (FIGS. 3 and 4) of 10-30 kN.

Figure 10:
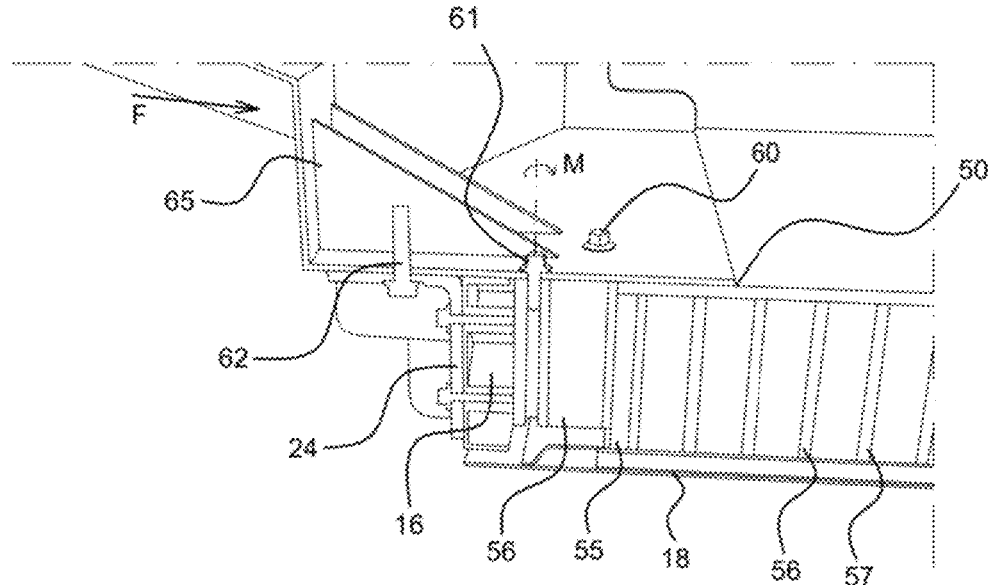
FIG. 10 shows a front part of the front frame section connected to the battery pack according to the disclosure via an anchor bracket.

FIG. 10 shows a front frame part 65 of the vehicle that is attached via bolts 60,61 to the anchor bracket 56, and via a bolt 62 to the bracket 24 on the front transverse beam 16. The frontal impact force Ff is deflected downward to the anchor bracket 56. The anchor bracket 56 is arc welded to the end plate 55, and has a number of bonded shear planes that distribute the load across the surface of the anchor bracket across the end plate 55 thereby keeping intrusions of the battery cells in the battery frame structure within safe limits.

The invention claimed is:

1. An electric vehicle, comprising a battery assembly with at least two rows of battery cells attached to a battery frame structure, wherein the battery frame structure comprises a number of accommodating cavities, arranged in a matrix, each battery cell being placed in a respective accommodating cavity and connected to adjacent walls of the respective accommodating cavity via a flowable bonding substance being inserted in a gap between the cells and the walls of the respective cavity, the flowable bonding substance expanding in the gap to compress each battery cell, wherein the battery frame structure is placed in a tray member comprising two longitudinal side profiles that are interconnected via a front and rear transverse beam, longitudinal peripheral walls of the battery frame structure being spaced apart from the longitudinal side profiles, a compressible filler member being placed between the longitudinal peripheral walls of the battery frame structure and the respective adjacent longitudinal side profile, and wherein the longitudinal side profiles of the tray member are coupled to respective longitudinal sill profiles of the electric vehicle such that the longitudinal sill profiles, the longitudinal side profiles, and the compressible filler members form deformation zones on each side of the battery frame structure in a side impact to the longitudinal sill profiles.

2. The electric vehicle according to claim 1, wherein the battery frame structure comprises longitudinal and transverse peripheral walls, the peripheral walls and the walls of the accommodating cavities being formed by injection molding, casting or additive manufacturing, of a first, solidifying material, the flowable bonding substance comprising a second substance.

3. The electric vehicle according to claim 1, wherein the accommodating cavities are of substantially the same height as a height of the battery cells, a bottom surface of the battery frame structure being substantially flat and supporting a thermally conductive layer contacting the bottom of each battery cell, a top surface of the battery frame structure being placed in a contacting relationship with a top cover.

4. The electric vehicle according to claim 1, a top plate and a bottom plate being placed in contact with the top and bottom plane of the battery frame structure, the top and bottom plates being attached to the longitudinal side profiles forming a casing.

5. The electric vehicle according to claim 4, the bottom plate comprising a number of cooling channels extending in a length direction, the cooling channels being connected to a cooling fluid inlet at a first transverse beam and being connected to a cooling fluid outlet manifold at a second transverse beam.

6. The electric vehicle according to claim 5, the bottom plate being covered by an insulating layer forming the outer bottom layer of the vehicle.

7. The electric vehicle according to claim 4, the front and the rear peripheral walls of the battery frame structure contacting a respective reinforcement metal end plate connected along its width to the respective front and rear transverse beams.

8. The electric vehicle according to claim 7, a front reinforcement metal end plate coupled to the front transverse beam via anchor brackets.

9. The electric vehicle according to claim 1, wherein the longitudinal sill profiles interconnect front and rear frame structures of the electric vehicle.

10. A battery pack for use in an electric vehicle, the battery pack comprising at least two rows of battery cells attached to a battery frame structure with a number of accommodating cavities, arranged in a matrix, each battery cell being placed in a respective accommodating cavity and connected to adjacent walls of the respective accommodating cavity via a flowable bonding substance being inserted in a gap between the cells and the walls of the respective cavity, the flowable bonding substance expanding in the gap to compress each battery cell, the battery frame structure being placed in a tray member comprising two longitudinal side profiles that are interconnected via a front and rear transverse beam, longitudinal peripheral walls of the battery frame structure being spaced apart from the longitudinal side profiles, a compressible filler member being placed between the longitudinal peripheral walls of the battery frame structure and the adjacent longitudinal side profile, wherein the longitudinal side profiles of the tray member are coupled to respective longitudinal sill profiles of the electric vehicle such that the longitudinal sill profiles, the longitudinal side profiles, and the compressible filler members form deformation zones on each side of the battery frame structure in a side impact to the longitudinal sill profiles.

11. The battery pack according to claim 10, wherein the longitudinal sill profiles interconnect front and rear frame structures of the electric vehicle.

12. A method of manufacturing a battery assembly for an electric vehicle, the method comprising:

forming a battery frame structure having longitudinal and transverse peripheral walls and comprising a number of accommodating cavities arranged in a matrix by injection molding, casting or additive manufacturing, inserting battery cells into the accommodating cavities, and filling up a gap between the cells and the walls of the respective cavity with a bonding material, connecting each battery cell to the walls of the respective cavity via the bonding material forming a unitary cell block, the bonding material expanding in the gap to compress each battery cell, placing the unitary cell block formed by the battery frame structure and the connected battery cells in a tray member comprising two longitudinal side profiles that are interconnected via a front and rear transverse beam, the longitudinal peripheral walls of the battery frame structure extending at a distance from the longitudinal side profiles, and inserting a deformable member between the longitudinal peripheral walls of the battery frame structure and the adjacent longitudinal side profile, wherein the longitudinal side profiles of the tray member are coupled to respective longitudinal sill profiles of the electric vehicle such that the longitudinal sill profiles, the longitudinal side profiles, and the deformable members form deformation zones on each side of the battery frame structure in a side impact to the longitudinal sill profiles.

13. The method according to claim 12, further comprising:

placing a top plate and a bottom plate on the top and bottom surfaces of the battery frame structure.

14. The method according to claim 13, further comprising attaching the top and bottom plates to a vehicle frame.

15. The method according to claim 13, further comprising connecting the top and bottom plates to longitudinal side profiles, forming a casing.

16. The method according to claim 12, wherein the longitudinal sill profiles interconnect front and rear frame structures of the electric vehicle.

* * * * *